United States Patent [19]

Hicks, Jr.

[11] Patent Number: 4,634,218
[45] Date of Patent: Jan. 6, 1987

[54] SINGLE MATERIAL OPTICAL FIBER AND METHOD

[75] Inventor: John W. Hicks, Jr., Northboro, Mass.

[73] Assignee: Polaroid Corporation, Cambridge, Mass.

[21] Appl. No.: 677,736

[22] Filed: Dec. 3, 1984

[51] Int. Cl.$^4$ ................................................ G02B 6/16
[52] U.S. Cl. ............................ 350/96.30; 350/96.31; 350/96.15; 350/96.32
[58] Field of Search ............... 350/96.12, 96.14, 96.15, 350/96.16, 96.29, 96.30, 96.31, 96.32, 96.33, 96.34; 455/610, 612; 65/3.11, 3.13

[56] References Cited

U.S. PATENT DOCUMENTS

| | | | |
|---|---|---|---|
| Re. 28,664 | 12/1975 | Miller | 350/96 |
| 3,535,017 | 10/1970 | Miller | 350/96 |
| 4,046,537 | 9/1977 | Deserno et al. | 65/2 |
| 4,086,001 | 4/1978 | Chen et al. | 350/96.14 |
| 4,111,520 | 9/1978 | Bernal | 350/96.12 |
| 4,179,189 | 12/1979 | Kaminow et al. | 350/96.33 |
| 4,274,854 | 6/1981 | Pleibel et al. | 65/2 |
| 4,307,938 | 12/1981 | Dyott | 350/96.30 |
| 4,315,666 | 2/1982 | Hicks, Jr. | 350/96.33 X |
| 4,354,736 | 10/1982 | Maklad et al. | 350/96.32 |
| 4,395,270 | 7/1983 | Blankenship et al. | 65/3.12 |

*Primary Examiner*—John Lee
*Assistant Examiner*—Lester Rushin, III
*Attorney, Agent, or Firm*—Francis J. Caufield

[57] ABSTRACT

A single mode optical waveguide and method for making same in which the equivalent of a core and cladding portions are made of the same material. The outer portion of the waveguide includes a tube which imposes a compressive stress through intermediate elements onto a central region of the waveguide, raising its index of refraction of that central region above that of the adjacent outer portions. The tube and other elements have different thermal coefficients of expansion and may have different freezing temperatures so that the outer elements are pressed against the core portion as the waveguide cools. A vise-like device may be used to maintain compression on the central portion and a part of the outer tube may be removed to provide for laterally coupling the waveguide with another waveguide.

8 Claims, 5 Drawing Figures

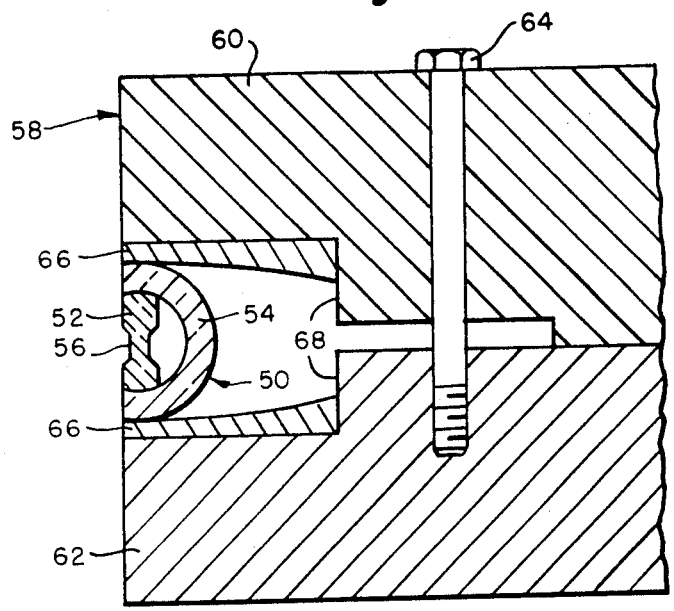
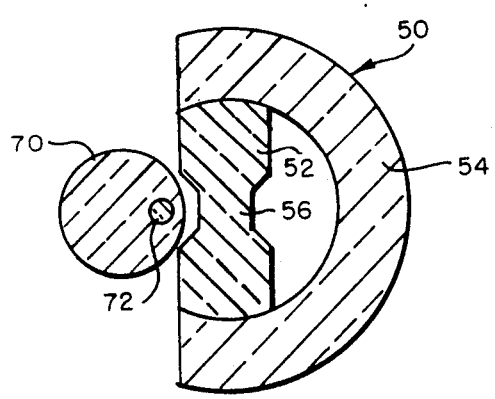

4,634,218

SINGLE MATERIAL OPTICAL FIBER AND METHOD

BACKGROUND OF THE INVENTION

This invention relates to optical waveguides in which all cross-sectional components of the waveguide structure may have the same nominal index of refraction. More particularly, it concerns such optical waveguides in which the light propagating cross-sectional region of the waveguide is imparted a higher than nominal index of refraction due to compressive loading of that region by other components of the waveguide structure.

Optical fiber waveguides have been utilized for the propagation of single-mode or multi-mode light energy in communications networks. Such waveguides conventionally employ a core along which the major portion of light energy is propagated and an exterior cladding. The optical function of the cladding is primarily as a medium having a lower index of refraction than the core so that the propagated light is confined to the core by refraction. Materials conventionally used to form the core and cladding may be various types of glass but substantially pure fused silica is preferred. Where fused silica is used as both the core and the cladding, the relative indices of refraction are effected by doping either the core or the cladding or both with various dopants which may either increase or decrease the index of refraction of the doped glass or fused silica.

U.S. Pat. No. Re. 28,664 reissued Dec. 23, 1975 contains a disclosure exemplary of optical waveguide structures which take advantage of the relative indices of refraction in glass or fused silica and air. In other words, the index of refraction of pure fused silica is higher than that of air by an amount adequate to enable propagation of light energy along a core surrounded by little more than air. Waveguides of this type conventionally envelope the core in a tube of glass to protect the core against contamination by foreign material and also to mitigate the effect of external perturbations.

While the prior art as represented by the afore-mentioned reissue patent shows promise from the standpoint of simplifying the fabrication of optical waveguides, structures heretofore developed are vulnerable from the standpoint of strength and also from the standpoint of polarization locking. In this latter respect, it is important, particularly to achieve the full benefit of single mode light energy propagation, that the cross-sectional region through which the single mode is propagated have constant axes of polarization irrespective of external perturbations. Heretofore, this problem has been addressed in conventional waveguides by reliance on the cladding to effect a diametric loading stress on the core for developing stress birefringence for purposes of polarization locking. Such internal stressing of the light propagating region of single material optical waveguides has not been possible out of the relatively fragile construction of single material waveguides heretofore proposed.

SUMMARY OF THE INVENTION

In accordance with the present invention, an optical waveguide fiber, preferably single mode, and method for its formation are provided using a glass fiber construction in which all cross-sectional components are made of a single material or at least of material having the same nominal index of refraction. A cross-sectional region of the waveguide is raised to a higher index than its original or nominal index of refraction by lateral compression developed by outer regions of the same cross-section which, being uncompressed or possibly in tension, exhibit a nominal or lower than nominal index of refraction in a manner analogous to the cladding of a conventional optical waveguide. The result of lateral compressive loading on the light conducting region not only provides a higher index, but also contributes to stress birefringence adequate to ensure polarization locking on preestablished orthogonal axes irrespective of external perturbations to which the waveguide may be subjected in an operative optical communication system.

The internal stress loading of the light propagating region is developed during formation of the waveguide by selection of the outer material to have a higher thermal coefficient of expansion and/or to have a "freezing" temperature somewhat lower than the material of the preform components which result in the inner portion of the waveguide product. In this way, the outer portions of the waveguide during drawing tend to freeze or solidify after the central regions of the waveguide have solidified so that the outer portion in effect "shrinks" about the solidified inner components.

The invention is applicable to several structural embodiments. In one embodiment, a central fiber is sandwiched between a pair of anvil-like rails in turn contained within an outer glass tube. Although the fiber, rails and tube may initially have the same index of refraction, the contraction of the outer tube on the rails results in compression of the central fiber sufficiently to elevate its index of refraction. In another embodiment, the equivalent of anvil-like rails converge on each other at a contacting point or region so that the compressive loading transmitted through the rails develops a higher index of refraction at the contacting region of the rails. In still another embodiment, a transverse web having a necked-down portion extends diametrically across the interior of an outer tube so that the necked-down portion sees a higher compression load than the remaining portions of the structure to provide a region of increased index of refraction.

A principal objective of the present invention is the provision of a single material optical waveguide structure and method for making same. Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 4 is a cross-section of the waveguide of FIG. 3 in a vise, wherein a part of the outer tube is removed; and FIG. 5 is a cross-section of the waveguide of FIG. 4 and a conventional waveguide positioned for lateral coupling.

DETAILED DESCRIPTION OF THE PREFERRED EMBODIMENTS

Figure 1:
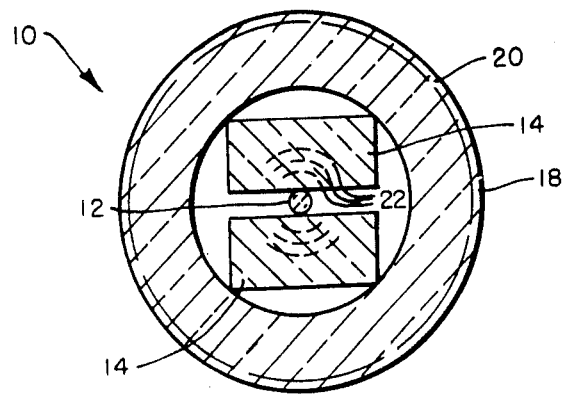
FIG. 1 is a cross-section of a first embodiment of a single material waveguide in accordance with the present invention.

An embodiment of a single material optical waveguide fiber in accordance with the present invention is illustrated in FIG. 1 of the drawings and generally designated therein by the reference numeral 10. The waveguide structure of this embodiment includes a central circular fiber 12 which is formed of a high purity light transmissive material such as pure fused silica and is contacted on opposite sides by two diametrically aligned compressive loading rails 14. The compressive loading rails 14 are preferably made of the same material as the central circular fiber 12. The compressive loading rails 14 illustrated in FIG. 1 are rectangular in cross section, but other shapes capable of transmitting a compressive force to the central circular fiber 12 may be used. The compressive loading rails 14 are held in place against the central circular fiber 12 by an outer cylindrical tube 18. The material of the outer cylindrical tube 18 may also be fused silica having an index of refraction the same as the central circular fiber 12 and the compressive loading rails 14. Because it is remote from the fiber 12 which, in operation of the waveguide 10, serves as the cross-sectional region along which light energy is primarily propagated, the material of the outer tube 18 may be selected primarily for its physical characteristics and secondarily for its optical characteristics. The outer tube 18, therefore may be of a glass other than fused silica and preferably having an index of refraction lower than fused silica.

In making a waveguide, such as the waveguide 10, according to the present invention, a central circular element preform, loading rail preforms and an outer tube preform are fed to a heating zone, such as a furnace, and heated to the molten state. The molten preforms are drawn from the heating zone to reduce their cross-sectional dimensions, and then cooled, with the outer tube preform surrounding and contacting the loading element preform. The material of the outer cylindrical tube 18 has a thermal coefficient of expansion (TCE) greater than that of the central circular fiber 12, and the outer cylindrical tube 18 reaches its "freezing" temperature after the material of the central circular fiber 12 and the compressive loading rails 14 reaches its "freezing" temperature, so that the central circular fiber 12 and the areas of the compressive loading rails 14 contacting the central circular fiber are placed under diametrically applied compressive stress. By "freezing" temperature is meant the temperature range through which the glass passes between a state in which the glass flows and a state in which the glass does not flow. For most glasses, the temperature range is short, about 100° C., and varies depending on the stresses involved and the sizes of the pieces of glass. For the purposes of the present invention, the glass effectively "freezes" between the annealing temperature and the transformation temperature, and probably near the transformation temperature.

The material of the outer cylindrical tube 18 and the material of the compressive loading rails 14 have properties such that the outer cylindrical tube 18 and the compressive loading rails 14 act like a vise tightening down on the central circular fiber 12. If the material of the outer cylindrical tube 18 and the material of the compressive loading rails 14 had the same "freezing" temperature, and if the waveguide 10 were cooled slowly so that all of the parts of the waveguide were in temperature equilibrium when the waveguide went down through the "freezing" temperature range, then it would suffice to specify that the contraction from the "freezing" temperature down to room temperature be high for the outer cylindrical tube 18 relative to the compressive loading rails 14. However, in the normal course of events, the waveguide 10 cools rapidly so that the outer cylindrical tube 18 (or at least its outer layer) is considerably cooler than the compressive loading rails 14 as the waveguide goes through the "freezing" temperature. Therefore, in the practice of the invention, the material of the outer cylindrical tube 18 is selected to have a "freezing" temperature lower than that of the compressive loading rails 14, or the waveguide 10 is cooled slowly through the temperature region around the "freezing" temperature, or both. The slow cooling of the waveguide 10 can be done during or after the drawing of the waveguide.

If the outermost layer of the outer cylindrical tube 18 is not under compression after cooling, the waveguide 10 will lack adequate strength for telecommunications use unless some unusual provisions are made for handling it. Therefore, in order to provide the outer cylindrical tube 18 with an outermost layer 20 which is in compression after cooling, either the outer cylindrical tube 18 is provided with an outermost layer one or two microns thick which has a higher "freezing" temperature than the remainder of the outer cylindrical tube 18 or with a lower contraction, that is, a lower TCE, from the "freezing" temperature down to room temperature, or the waveguide 10 is shock cooled just as it reaches the "freezing" temperature of the outer cylindrical tube 18, so that only the outermost layer 20 of the outer cylindrical tube 18 "freezes" in advance of the remainder of the waveguide.

When the waveguide 10 is constructed in accordance with the method described, the central circular fiber 12 is placed under a strong compressive stress along a diametric line. In the embodiment of FIG. 1 as illustrated, the stress is vertically oriented through the central circular fiber 12. In addition, the areas of the compressive loading rails 14 contacting the central circular fiber 12 are under a similar compressive stress. This stress is represented in FIG. 1 by the dashed lines 22, which are lines of constant stress. Thus, the portions of the compressive loading rails 14 actually in contact with the central circular fiber 12 have a stress substantially equal to that of the central circular fiber. The portions of the compressive loading rails 14 along the innermost stress line 22 have a stress equal to one another but somewhat less than the stress of the central circular fiber 12. The portions of the compressive loading rails 14 along the middle stress line 22 are under less stress than the portions along the innermost stress line 22, and the portions along the outermost stress line 22 are under less stress than the portions along the middle line 22. Thus, the lines 22 illustrate the stress gradient in the compressive loading rails 14.

The effect of the diametric compressive loading on the central circular fiber 12 during single-mode operation of the waveguide 10 is stress birefringence which results in two mutually orthogonal transverse polarization axes in the central circular fiber 12, one axis parallel to the applied stress, and the other axis transverse to the applied stress. Single-mode light energy of a specific frequency or wavelength introduced into an input end of the waveguide 10 and propagated along the length thereof is split along the polarization axes into polarized waves. This division of the light energy is due to a difference in the propagation constants on the two axes of polarization. Specifically, the axis parallel to the direction of the compressive force has an apparent index of refraction which is higher than the apparent index of refraction on the axis transverse to the applied stress. Thus, light energy propagates at a higher velocity on the parallel axis than on the transverse axis.

The waveguide construction illustrated in FIG. 1 produces in the central circular fiber 12 a measure of stress birefringence adequate to effect polarization locking on both orthogonal axes throughout the full length of the waveguide 10 irrespective of external perturbations having a tendency to upset the direction of polarization. The construction produces stress birefringence and the resultant polarization additionally in the area of the compressive loading rails 14. However, because an air gap 24 exists at the sides of the central circular fiber 12 between the compressive loading rails 14, the usual $HE_{11}$ mode of circular fibers is badly perturbed, and a two-lobed mode tends to be the lowest order surviving mode. For a significant portion of the spectrum, the waveguide 10 sustains only one polarization, along the axis of stress. Thus, it is a true single polarization waveguide for that portion of the spectrum and not merely a polarization retaining waveguide.

Since the contacting areas of the compressive loading rails 14 are under compressive stress and, therefore, have an increased index of refraction, they transmit eletromagnetic energy and define, along with the central circular fiber 12, an oblong region of relatively high index circumscribed in part by air and in part by the material of the rails 14 at its nominal and thus lower index of refraction.

Figure 2:
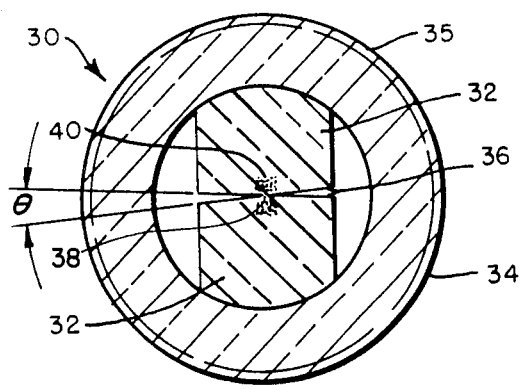
FIG. 2 is a cross-section of a second embodiment of a single material waveguide in accordance with the present invention.

A single material waveguide according to the present invention can be constructed without a central circular fiber. As can be seen from FIG. 2, a single material waveguide designated generally by the reference numeral 30 includes a pair of diametrically aligned compressive loading rails 32 of a high purity light transmissive material held in compressive stress against one another by an outer cylindrical tube 34 having an outer layer 35 under compression. The compressive loading rails 32 have facing surfaces 36, each of which is bevelled to define a central ridge 38 which contacts the central ridge 38 of the opposite compressive loading rail 32. The stress is highest in the area of the contact between the ridges 38 and falls off, as indicated by the stippled region 40 around the contact area. The stress produces birefringence and polarization locking in the areas of the compressive loading rails 32 near the contacting ridges 38, whereby these nearby areas define the central portion of waveguide 30. The remaining areas of the compressive loading rails 32 and the outer cylindrical tube 34 define the peripheral portion. The angle $\theta$ between the facing bevelled surfaces 36 is made as small as possible, on the order of 5°. When such a small angle is used, the contact between the compressive loading rails 32 occurs not only at the point where the ridges 38 meet, but along a width equal to ½ to ¾ the width of a conventional single-mode core which has an index difference equal to the stress induced index difference of the present central portion.

Figure 3:
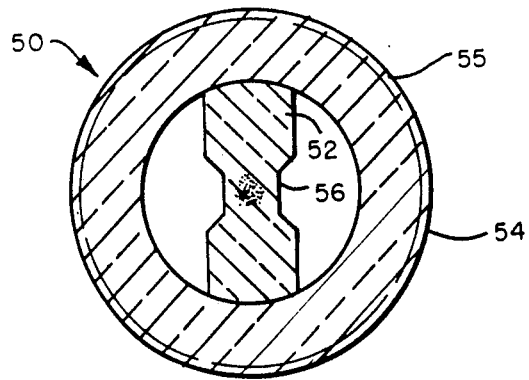
FIG. 3 is a cross-section of a third embodiment of a single material waveguide in accordance with the present invention.

An embodiment of the present invention particularly well suited for lateral coupling with another waveguide is shown in FIGS. 3-5. The single material waveguide is designated generally by the numeral 50 and is composed of a diametric web 52 held under compressive stress by an outer cylindrical tube 54, which has an outer layer 55 under compression. The diametric web 52 is made of a high purity light transmissive material extending between inner surfaces of the outer cylindrical tube 54 and having a neck 56 in the center of the waveguide 50. The reduced width of the neck 56 sets up stresses in the neck which are higher than in the rest of diametric web 52, so that the neck 56 and the areas of the diametric web 52 adjacent to the neck define the central portion of the waveguide 50, with the remaining areas of the diametric web and the outer cylindrical tube 54 defining the peripheral portion of the waveguide.

In the region to be coupled, the waveguide 50 is placed in a device, such as a vise 58, for removing the tension in the outer cylindrical tube 54. The vise 58 is illustrated in FIG. 4 as having upper and lower members 60 and 62, respectively, and a screw 64 for moving the members 60 and 62 toward one another. The members 60 and 62 have clamping surfaces 66 made of a fairly rigid plastic or metal positioned in recesses 68. The clamping surfaces 66 engage the outer cylindrical tube 54 at the top and bottom of the diametric web 52, and the screw 64 is turned to tighten the upper and lower members 60 and 62 against the outer cylindrical tube. A side of the outer cylindrical tube 54 is exposed so that it can be ground away to provide access to the diametric web 52 in the waveguide 50. The access allows another waveguide 70, for example, a circular fiber, in this case having an eccentrically positioned core 72 to be brought into proximity to the central portion defined by the neck 56 of the waveguide 50 for lateral coupling, as is shown in FIG. 5.

In light of the foregoing, it will be appreciated that as a result of the present invention a highly effective single material optical waveguide and method are provided by which the principal objective, among others, is completely fulfilled. It is contemplated and will be apparent to those skilled in the art from the preceding description that modifications and/or changes may be made in the disclosed embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. An optical waveguide comprising:
   means defining one cross-sectional region of light transmissive material having a preestablished nominal index of refraction and another cross-sectional region of light transmissive material having a preestablished index of refraction the same as the nominal index of refraction of said region; and
   means for applying a compressive stress to said one region to raise the index of refraction of said one region, said means defining said one and another regions includes a pair of loading rails in compression against one another, a first portion of said rails being included in said one region, and a second portion of said rails being included in said another region, each said rail having a surface defining a ridge, and said ridges being in compression against one another.

2. The invention of claim 1 wherein said surfaces are bevelled to define said ridges.

3. The invention of claim 2 wherein said bevelled surfaces contact each other over a width approximately equal to ⅓ to ¾ the width of a conventional single mode core which has an index difference equal to the index difference between said nominal index of refraction and the raised index of refraction.

4. An optical waveguide comprising:
   means defining one cross-sectional region of light transmissive material having a preestablished nominal index of refraction and another cross-sectional region of light transmissive material having a preestablished index of refraction the same as the nominal index of refraction of said one region; and
   means for applying a compressive stress to said one region to raise the index of refraction of said one region, said means defining said one and said another cross-sectional regiona being a web having a portion of reduced width.

5. The invention of claim 4 wherein said web is diametric of said waveguide, and said portion of reduced width forms a necked-down portion of said web.

6. A method of laterally coupling with another optical fiber waveguide a single material optical fiber waveguide having an internal region of light transmissive material held in compression by an outer tube in tension comprising the steps of:
   externally applying a compressive force across the outer tube so as to maintain the compression originally provided by said outer tube in said internal region of light transmissive material during and after a portion of the outer tube is removed;
   removing a portion of the outer tube to expose said internal region; and
   placing the other waveguide alongside and parallel to said internal region to couple energy from said single material waveguide to said outer waveguide.

7. The method of claim 6 wherein said internal region includes a web having a reduced width portion, and the step of placing further comprises placing the other waveguide alongside and parallel to said reduced width portion.

8. The method of claim 6 wherein the step of removing comprises grinding away a portion of the outer tube.

* * * * *